May 14, 1929.　　　W. JARDH　　　1,712,766
GEARED HEADSTOCK FOR LATHES
Filed June 25, 1924　　6 Sheets-Sheet 1

INVENTOR
WILHELM JARDH
BY Graham + ...
ATTORNEYS.

May 14, 1929.  W. JARDH  1,712,766
GEARED HEADSTOCK FOR LATHES
Filed June 25, 1924   6 Sheets-Sheet 2
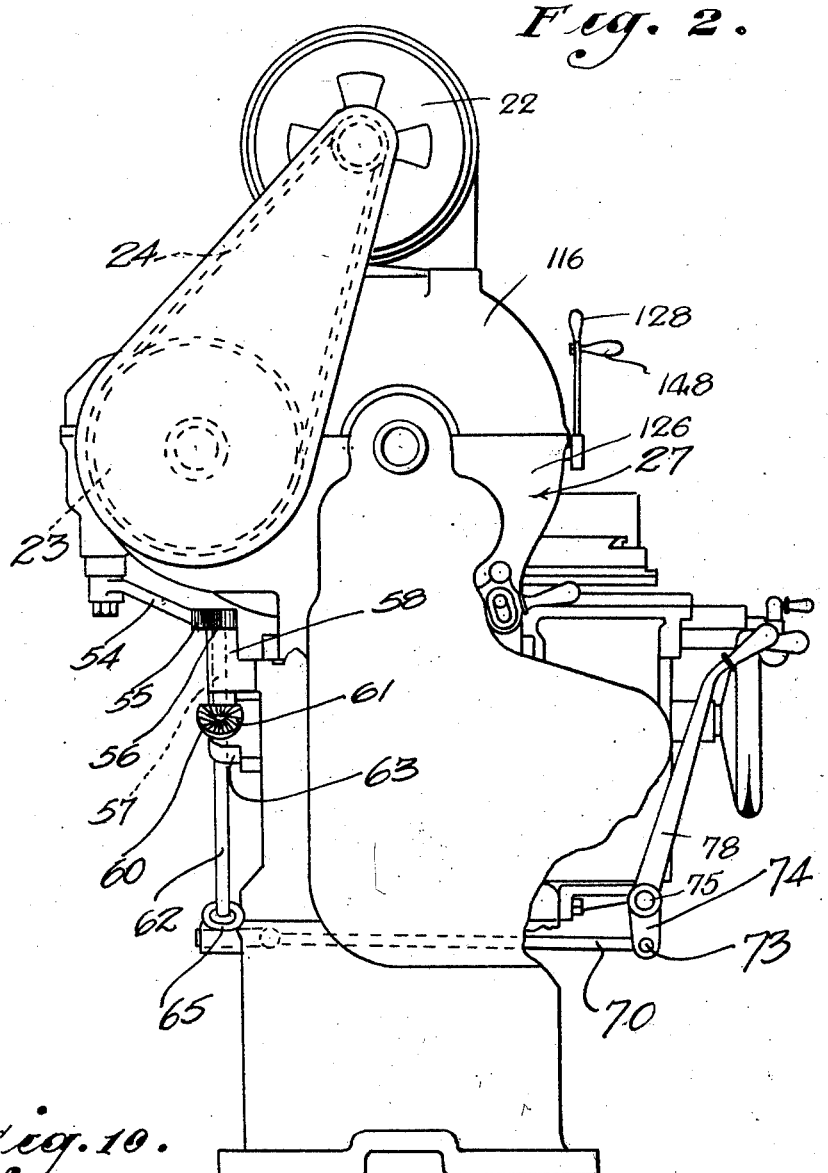
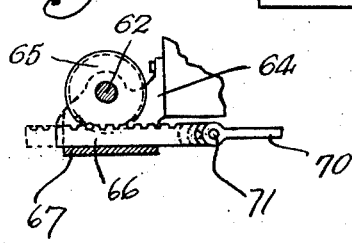
INVENTOR.
WILHELM JARDH.
BY,
ATTORNEYS.

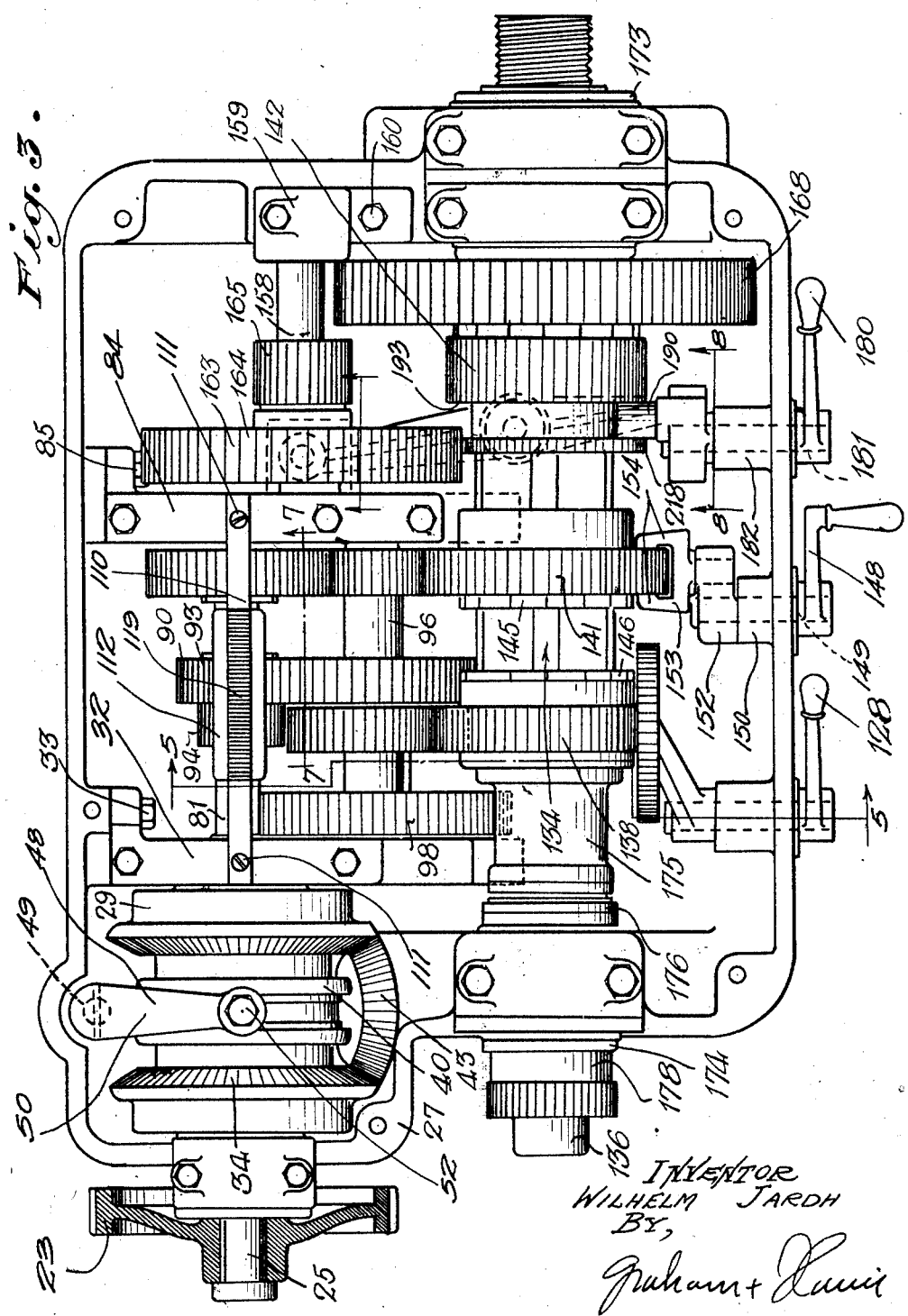

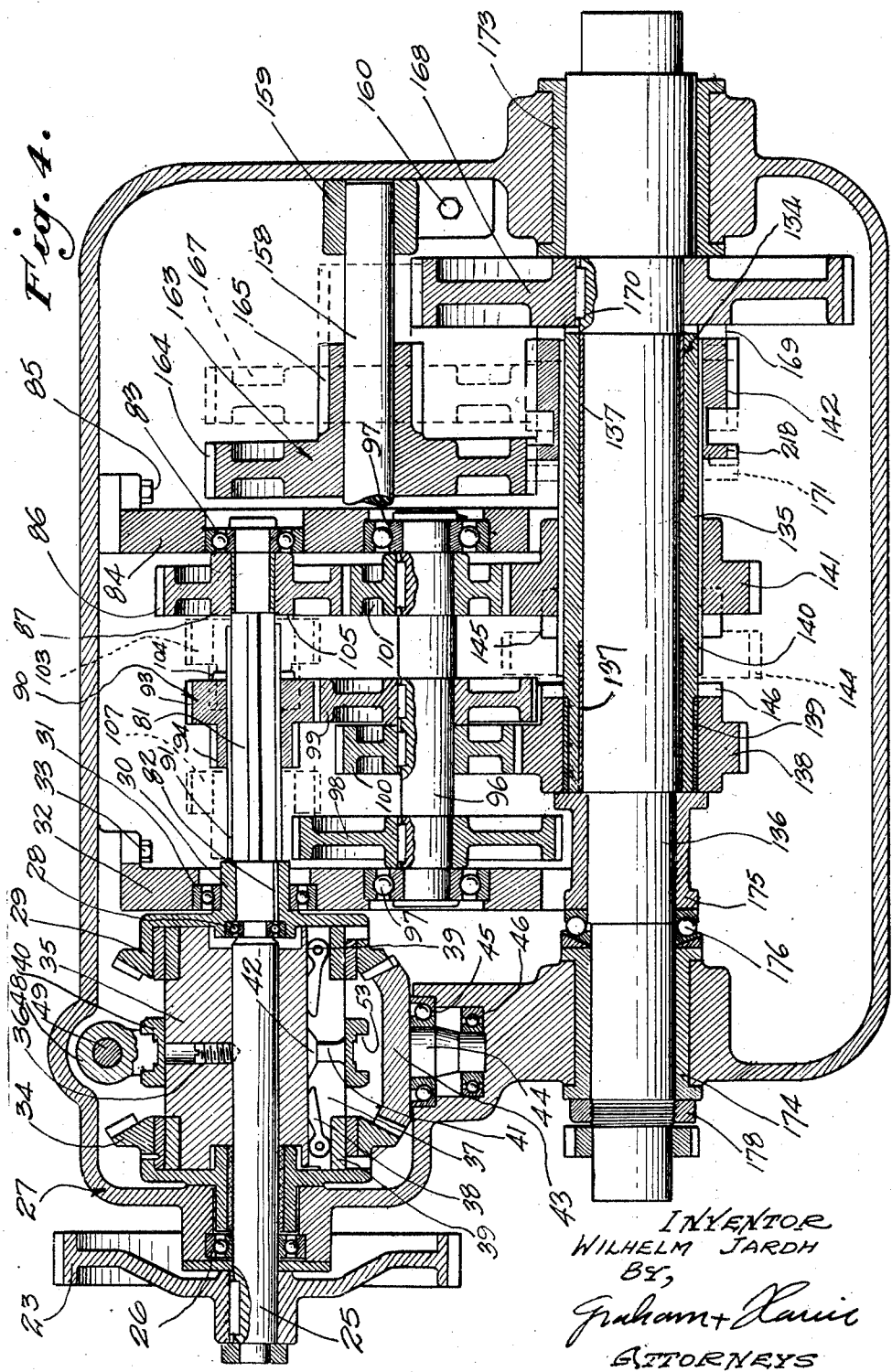

May 14, 1929. W. JARDH 1,712,766
GEARED HEADSTOCK FOR LATHES
Filed June 25, 1924 6 Sheets-Sheet 5

INVENTOR
WILHELM JARDH
BY,
Graham + Lanier
ATTORNEYS.

May 14, 1929.   W. JARDH   1,712,766
GEARED HEADSTOCK FOR LATHES
Filed June 25, 1924   6 Sheets-Sheet 6
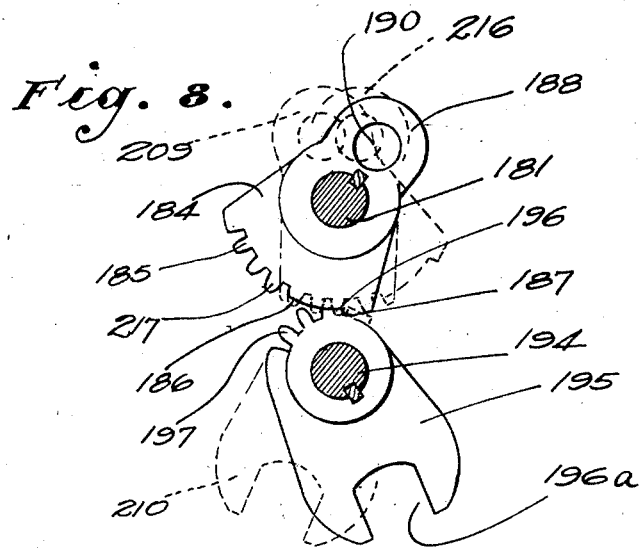
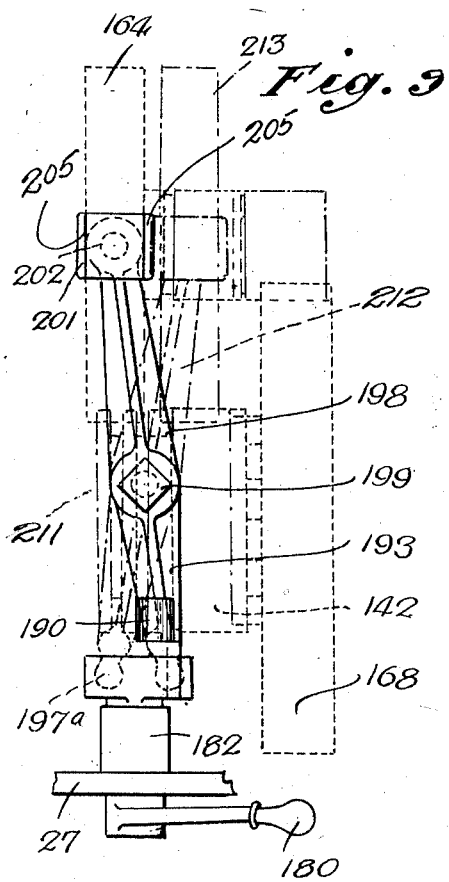
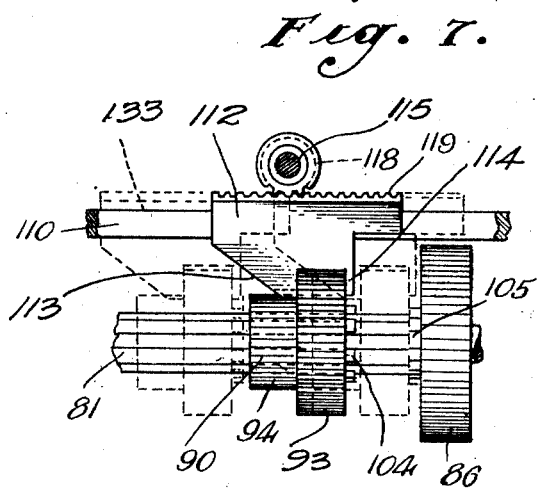
INVENTOR
WILHELM JARDH.
BY,
Graham & Hain
ATTORNEYS.

Patented May 14, 1929.

1,712,766

UNITED STATES PATENT OFFICE.

WILHELM JARDH, OF LOS ANGELES, CALIFORNIA, ASSIGNOR TO AXELSON MACHINE COMPANY, A CORPORATION OF CALIFORNIA.

GEARED HEADSTOCK FOR LATHES.

Application filed June 25, 1924. Serial No. 722,302.

This invention relates to lathes and relates particularly to a geared head stock therefor.

In certain of the machine industries, such as the oil well industry, there is great need for a lathe which will meet the heavy duty demands therein. A lathe which is very much in need is one which will take a wide diversity of work. The lathe must be capable of taking heavy roughing cuts down to accurate finishing cuts, and must also be suitable for handling heavy work and light work. It is also necessary that a lathe of this character be constructed so that it may be quickly adapted to the various classes of work which it is to handle.

It is an object of this invention to provide a lathe of this character which is adapted to handle a wide range of work. The lathe is designed to be rugged in construction so that it may handle the heavy work; and compact in design so that it may occupy a minimum of space.

It has certain features which will render it readily adaptable to the various classes of work, and also has features of design which will render it applicable to the handling of the light and accurate work. It is an object to provide a lathe which will be very suitable for general service.

It is a further object of the invention to provide in a lathe of this character a geared head stock which will provide a great number of spindle speeds.

It is a further object to provide in a lathe of this character a gear shifting mechanism which will be very convenient and easy to operate.

It is a still further object to provide a gear shifting mechanism which will be so designed that it will be impossible to shift more than one pair of gears of two shafts in driving engagement at the same time, thereby preventing any damage due to the locking of the gears.

It is also an object of this invention to provide an actuating mechanism which is very simple to operate and which is always accessible to the workman running the lathe.

It is another object of the invention to provide a geared head which may have means by which it may be quickly stopped if desired.

My invention consists essentially of a head stock having conveniently located levers which afford instant change to any of the spindle speeds. The speed changes are obtained through a series of gears mounted on shafts. The whole arrangement incorporates the very desirable qualities of simplicity, compactness and ruggedness. A suitable clutch with forward and reversing mechanism is provided through which motion is imparted to the various shafts. The lathe may be driven by any suitable means, such as a motor or through a belt drive. Starting, stopping and reversing is controlled by levers arranged in front of the bed of the lathe, one of which may be located at the head end of the lathe and another may be arranged to travel with the carriage, thus affording accessible control to the operator at all times, no matter what length of work is being machined.

Further objects of the invention and the advantages thereof will be made evident hereinafter.

Referring to the drawings which are for illustrative purposes only,

Fig. 2 is an end view of the head stock and of the lathe.

Fig. 3 is a view of a particular type of head stock embodying my invention, with the upper portion of the head stock housing removed.

Fig. 4 is a diagrammatic view similar to Fig. 3, the parts of this view being arranged in section in such a manner as to clearly depict the relationship and driving arrangement between the various shafts and gears.

Fig. 7 is a fragmentary view taken as indicated by the line 7—7 of Fig. 3.

Fig. 8 is a fragmentary section taken as indicated by the line 8—8 of Fig. 3.

Fig. 9 is a diagrammatic view which clearly illustrates the back gear shifting mechanism. In this view certain of the parts are drawn in very light lines so that the parts included in the back gear shifting mechanism may be emphasized.

Fig. 10 is a fragmentary view taken at the back portion of the lathe substantially as indicated by the line 10—10 of Fig. 1. This view shows the rack and gear arrangement included in the actuating mechanism of the lathe.

Figure 1:
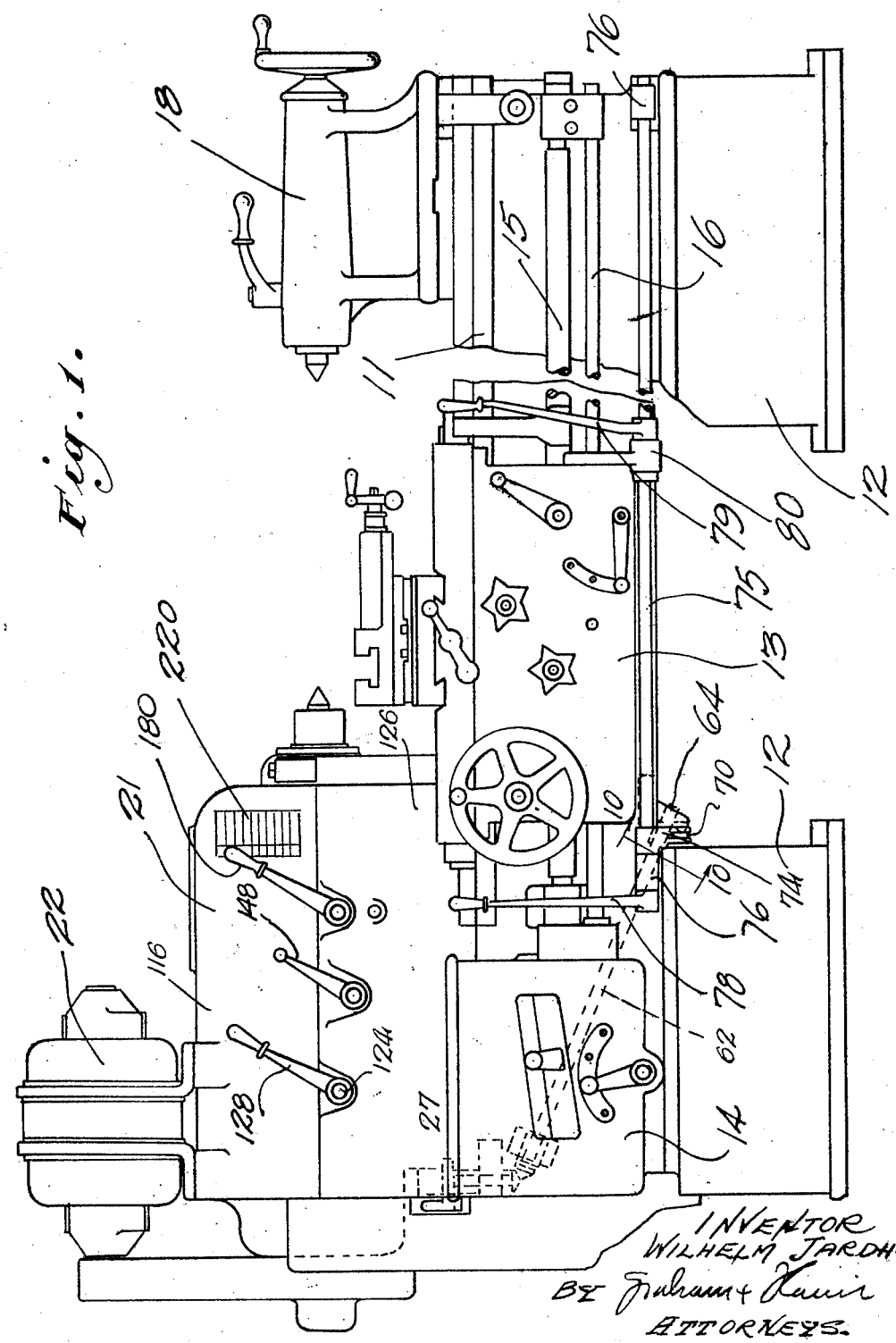
Fig. 1 is a front elevation of a lathe in which the various features of my invention are incorporated.

As shown in Fig. 1, the lathe to which my invention may be applied may consist of a bed 11 having suitable supports 12, a carriage 13, a gear box 14, through which a lead screw 15 and a drive feed screw 16 are driven, and a customary tail stock 18. A head stock 21 is shown as being provided on the lathe which may include the various features which my invention provides. As clearly shown in Figs. 1 and 2, means for driving the head 21 may be provided by a suitable motor 22 which drives a drive wheel 23, as indicated in Fig. 2, through a suitable belt, gears, or chain 24. As shown in Figs. 3 and 4, the drive gear 23 may be secured on a clutch shaft 25. This clutch shaft may be rotatably supported by a ball bearing 26 which is shown as held by the casing 27 of the head and by a ball bearing 28 which is shown as being supported by a forward bevel gear 29. The forward bevel gear 29 may have a hub 30 which extends through and is supported by a ball bearing 31, this ball bearing in turn being arranged to be supported by a bracket 32 which is secured to the head by means of suitable bolts, such as indicated at 33. A reverse bevel gear 34 is rotatably mounted on the shaft 25 just inside the casing 27, as shown. Between the bevel gears 29 and 34 a clutch body 35 is rigidly secured to the shaft 25 by a suitable key and set screw, as shown at 36. A slot 37 is provided in the body 35 in which slot expanding members 38, as shown in Fig. 4, are provided. On the ends of the member 35 are expansible members 39. Slidable but non-rotatable on the body 35 is a shifting ring 40, this ring 40 having an arm 41 which extends into the slot 37 and has a wedge member 42 provided thereon which rests against the bottom of the slot 37. When the ring 40 is in the position shown in Figs. 3 and 4, the shaft 25 and the body 35 rotate, whereas the bevel gears 29 and 34 may not rotate. By shifting the ring 40 to the right so that the wedge 42 engages one of the expander members 38, the adjacent band 39 is expanded in such a manner as to provide a driving engagement between the body 35 and the gear 29. By shifting the ring 40 to the left the wedge 42 will engage the expanding member 38. This swings the expanding member in such a manner as to expand the adjacent band 39 and provide a driving engagement between the body 35 and the reversing bevel gear 34. The bevel gear 34 is in mesh with a transmission gear 43, this gear 43 having a shaft 44 which is supported by the ball bearings 45 and 46, supported as shown by the housing 27. The transmission gear 43 is in turn in mesh with the forward drive bevel gear 29. When the ring 40 is shifted to the right a forward motion is imparted to the gear 29. However, when the ring is shifted to the left a forward motion is imparted to the gear 34 which rotates the transmission gear 43 and the gear 43 rotates the gear 29 in a reverse direction. In this manner a forward and reversing drive is acquired.

A means for actuating the clutch described is shown as being in the form of a yoke member 48 which is secured on a rod 49. The yoke member has arms 50 which extend around the ring 40. Pins 52 are secured to the arms 50 which extend into the slot 53 of the ring 40 for providing engagement therebetween. The rod 49, as shown in Fig. 2, extends downwardly through the casing 27 and has a segment member 54 secured at the lower end thereof. On the extending end of the member 54 is a segment portion 55 which engages a segment gear 56, this segment gear 56 being secured at the upper end of a vertical shaft 57 which may be supported by a suitable bracket 58. The lower end of the shaft 57 may be provided with a bevel gear 60 which meshes with a bevel gear 61. The bevel gear 61 may be secured on a diagonally extending shaft 62 which is shown as being rotatably supported by bearings 63 and 64. The lower end of the diagonal shaft 62 is provided with a rack gear 65 which is arranged to engage and be rotated by a rack 66 which is slidable in a suitable support 67 which is shown as being formed integral with the bearing member 64. A link member 70 pivots at one end to the rack 66, as indicated at 71, and at the other end thereof is pivotally secured by a pin 73 to an arm 74. As shown clearly in Figs. 1 and 2, the arm 74 is rigidly secured to an actuating shaft 75, this shaft 75 being rotatably secured along the front of the lathe, as shown, by any suitable bearing members 76. A stationary actuating lever 78 is provided, as shown in Fig. 1, at the head stock end of the lathe. A traveling actuating lever 79 is shown as being situated directly adjacent to the right hand end of the carriage 13, the lever 79 being splined to the shaft 75 and being moved with the carriage 13 through the bearing member 80. By swinging either of the levers 78 or 79, motion is conveyed to the rack 66 through the link 70 and the arm 74. This rotates the shaft 62 which in turn rotates the shaft 57. The gear 56 engaging the segment 55 rotates the member 54 in a manner to rotate the shaft 49 and to swing the yoke 48. All this actuation results in an axial moving of the ring 40, which movement engages either of the expanding members 38, which accomplishes the forward driving or the reversing of the gear 29.

Secured in the hub 30 of the gear 29 is a primary shaft 81, the shaft 81 being keyed thereto, as indicated at 82. The right hand end of the shaft 81 is rotatably supported by a ball bearing 83 which is secured in a bracket 84. The bracket may be secured in the housing 27 by suitable bolts or fixtures, as indicated at 85. Near the right hand end of the shaft 81 is shown a primary splined member 90 which is arranged with slots to cooperate with splines 91 provided on the shaft 81. The member 90 is designed to provide a pair of integral gears 93 and 94.

Adjacent to the primary shaft 81 is a secondary shaft 96, this shaft 96 being rotatably supported by ball bearings 97 which are secured in the brackets 32 and 84. On the shaft 96 are rigidly secured driven gears 98 and 99, a drive gear 100, and a drive and driven gear 101. From Fig. 4 it will be seen that when the member 90 resides in the position shown by the full lines, the gear 93 is in mesh with the secondary driven gear 99. The member 90 being slidable is capable of being moved into the position indicated by the dotted lines 103 of Fig. 4. When the gear is in this position, the integral clutch element 104 engages with the integral clutch element 105 of the primary rotatable gear 86 and provides a driving engagement between the shaft 81 and the gear 86. From this it will be seen that the gear 86 which is always in mesh with the gear 101 at this time will drive the shaft 96. The member 90 is also capable of being moved into the position indicated by the dotted lines 107 of Fig. 4. When the member is in this position, the gear 94 meshes with the secondary driven gear 98 and serves to drive the secondary shaft 96; in other words, the shaft 81 is arranged to have one speed, and through the various shifts the shaft 96 is arranged to have three speeds, as shown.

Mechanism for shifting the primary splined element 90 is clearly shown in Figs. 3, 5, 6 and 7. The primary splined member shifting mechanism may consist of a carriage bar 110 which may be secured on the upper faces of the brackets 32 and 84 by suitable screws 111. Slidably mounted on the bar 110 is a primary shifting element 112 which has a pair of arms 113 and 114 which extend on either side of the gear 93 of the member 90. On a cross shaft 115 which is rotatably secured in the upper half 116 of the housing 27 is provided a shifting member engaging gear 118. This gear 118 engages the rack teeth 119 provided on the upper face of the shifting member 112. On the opposite end of the cross shaft 115 is secured a gear 120. This gear 120 is arranged to be engaged by a segment portion 121 of a segment member 122. The member 122 is secured on the inner end of a shaft 124 which is rotatably secured in the bearing 125 provided in the lower half 126 of the housing 27. The shaft 124 extends forwardly and outwardly from the casing 27 and has a primary shifting lever 128 secured thereto. When the lever 128 and the other shifting mechanism resides in the position as shown by the full lines in the figures, the primary shifting element 90 is positioned so that the gear portion 93 is in engagement with the secondary driven gear 99. By shifting the lever 128 to the right or into the position as indicated by the dotted lines 130, the gear will be moved through the intervening shifting mechanism into the position as indicated by the dotted lines 103 of Fig. 4. When in this position the shaft 81 drives the shaft 96 through the gears 86 and 101. By shifting the primary shifting lever into the position as indicated by the dotted lines 131 of Fig. 6, the intervening mechanism will be actuated in such a manner as to move the member 90 into the position as indicated by the dotted lines 107 of Fig. 4. When in this position the shifting element 112 is in the position indicated by the dotted lines 133 of Fig. 7. When the gear 90 is in the position indicated by the dotted lines 107, the shaft 81 drives the shaft 96 through the gear 94 and the secondary drive gear 98.

A tertiary element 134 is provided which may comprise a tertiary hollow shaft 135 which is shown as rotatably mounted on a lathe spindle 136, suitable bearings 137 being provided for rendering the sleeve member 135 rotatable. At the extreme leftward end of the sleeve 135 is a tertiary rotatable gear 138 which may be rendered rotatable on the sleeve 135 by a bearing 139. On the splined portion 140 of the sleeve 135 is slidably but non-rotatably placed a tertiary splined driven gear 141. At the right hand end of the sleeve 135 and on the splined portion 140 is a tertiary splined drive gear 142. When the gear 141 is in the position shown by the full lines of Fig. 4, the gear is in mesh with the secondary drive and driven gear 101. The gear 141 being slidable is capable of being moved in the position as indicated by the dotted lines 144 of Fig. 4. When in this position the gear 141 is disengaged from the gear 101, and the positive clutch element 145 engages the positive clutch element 146 of the rotatable gear 138, this engagement of the elements 145 and 146 providing a driving engagement between the rotatable gear 138 and the sleeve 135. It will be seen that owing to the fact that the gear 138 is always in mesh with the primary drive gear 100 that the sleeve member 135, when the gear 141 is in the position indicated by the dotted lines 144, will be driven through the gears 100 and 138.

Figure 5:
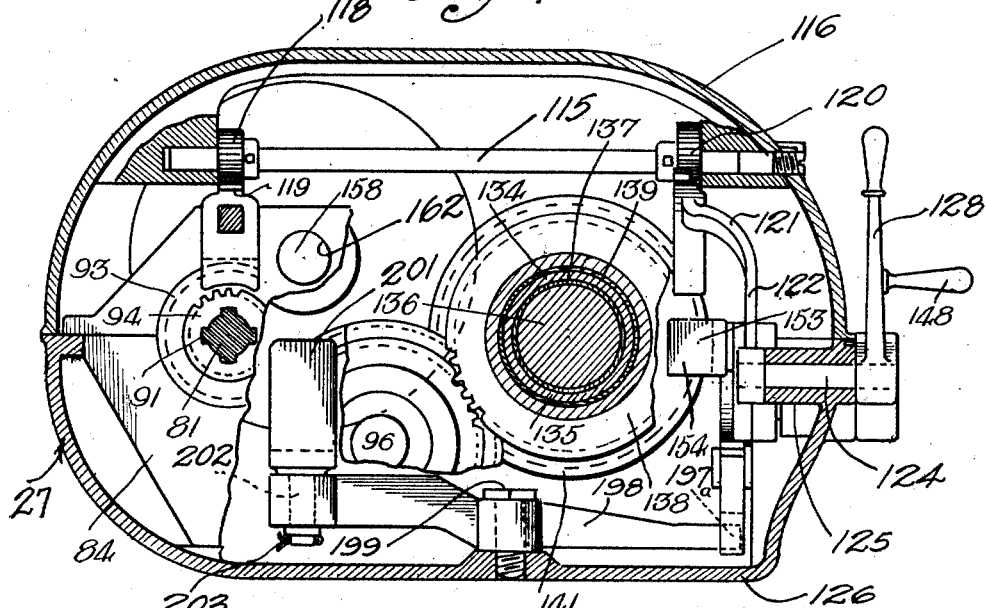
Fig. 5 is a sectional view taken substantially as indicated by the line 5—5 of Fig. 3.
Figure 6:
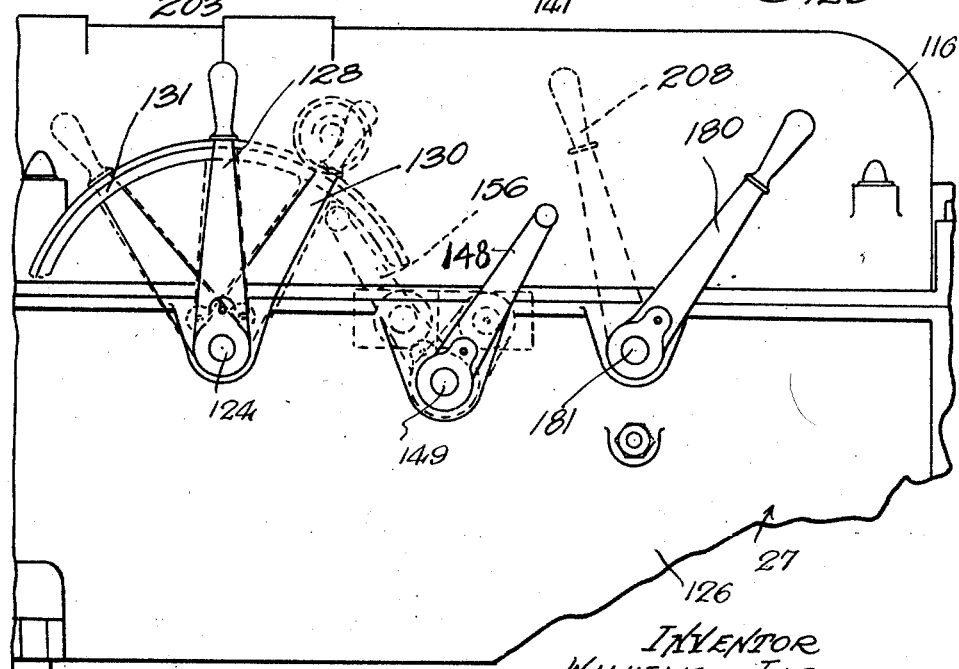
Fig. 6 is an enlarged fragmentary view of the head stock portion of the lathe showing the shifting mechanism and the various positions which the shifting levers may assume.

Mechanism for shifting the tertiary splined driven gear 141 is shown clearly in Figs. 3, 5 and 6. On the outside of the housing 27 is a tertiary shifting lever 148. The lever 148 is secured on a shaft 149 which extends through a bearing 150 provided by the lower half 126 of the housing 27. On the inner end of the shaft 149 is an arm 152 which is rigidly secured thereto. Pivoted to the extending end of the arm 152 is a yoke member 153, as shown in these figures. Arms 154 are provided by the yoke 153 which extend to either side of the tertiary splined driven gear 141, as shown in Figs. 3 and 5. When the lever 148 is in the position shown by the full lines of the drawing, the gear 141 is in engagement with the secondary drive and driven gear 101. By shifting the lever into the position as indicated by the dotted lines 156 of Fig. 6, the gear 141 will be shifted into the position indicated by the dotted lines 144 of Fig. 4 by means of the shaft 149, the arm 152 and the yoke 153. It will be seen that when the gear 141 is in the position indicated by the full lines of the drawing, the sleeve 135 will be driven by the shaft 96 through the gears 101 and 141. It will likewise be seen that when the gear 141 is shifted into the position indicated by the dotted lines 144 of Fig. 4, that the sleeve 135 will be driven by the shaft 96 through the gears 100 and 138. It will be understood then that the shaft 81 has one speed, the shaft 96 has three speeds, and the sleeve 135, due to the two shifting positions of the gear 141, will have six speeds.

A back gear element is provided which may consist of a non-rotatable back gear shaft 158 which is supported at the right hand end by a bracket 159 secured to the housing 27 as by a bolt 160 and supported at the other end thereof, as shown in Fig. 5, in the bore 162 provided by the bracket 84. Slidably and rotatably arranged on the shaft 158 is a back gear member 163 which provides integral gears 164 and 165. The back gear member 163 is capable of being shifted into the position indicated by the dotted lines 167 of Fig. 4. When in this position the gear 165 is in engagement with the spindle gear 168 which is shown as being rigidly supported to the spindle 136 adjacent to the right hand end of the sleeve 135. The tertiary splined drive gear 142 when in the position indicated by the full lines of the drawing provides driving engagement between the sleeve 135 and the gear 168 through the engagement of the positive clutch element 170 of the gear 168 with the clutch element 169 of the gear 142. It will be seen that if the member 163 were shifted in the position indicated by the dotted lines 167 without first shifting the gear 142 into the position indicated by the dotted lines 171 of Fig. 4, the gear 168 would be in engagement with the member 163 as well as in engagement with the member 142, in which case a locking of the gears of the head would be effected and considerable damage might be incurred. In order to prevent any mishaps of this sort it is necessary to provide a back gear shifting mechanism which will shift the gear 142 out of engagement with the gear 168 slightly before the member 163 is shifted into engagement with the member 168.

The spindle 136 on which the sleeve 135 is rotatable and to which the gear 168 is rigidly secured may be supported as shown by bearings 173 and 174 which may be provided by the housing 27. Just inside the bearing 174 may be provided a thrust sleeve 175 and a thrust bearing 176. On the rear extending end of the spindle 136 there may be provided a thrust nut 178 by which the end play of the spindle may be adjusted.

The back gear shifting mechanism is clearly shown in Figs. 3, 5, 6, 8 and 9. This back gear shifting mechanism may comprise a back gear shifting lever 180 which, as shown, is situated outside and to the front of the housing 27. The lever 180 is arranged on the shaft 181 which extends to the inside of the housing 27 through, and is supported by, a bearing 182. As clearly shown in Fig. 8, on the inner end of the shaft 181 is rigidly secured an upper segment 184. The lower portion of the segment 184 is provided with a number of gear teeth 185 and adjacent to the teeth 185 on the right thereof, as shown, is provided a surface 186 which is circumferential and extends in substantially the same plane as the pitch diameter of the teeth 185. At the extreme right hand end of the surface 186 is provided a stop 187. On the upper portion of the segment 184 is provided a lug portion 188, into which the tertiary drive gear shifting member 190 extends. The shifting member 190 extends into an annular groove 193 provided by the gear 142, as shown in Figs. 3 and 9. On the pin 194, which is situated directly below the shaft 181 and secured to the housing 27, is swingably arranged a lower segment 195. The upper portion of the segment 195 is provided with a stop 196 and gear teeth 197, and the lower portion of the lower segment 195 is provided with a recess 196$^a$. As shown best in Figs. 5 and 9, the end 197$^a$ of a pivoted shifting arm 198 extends into the recess 196$^a$. This arm 198 may be pivoted by a suitable pin or bolt 199, as shown. A clevis member 201 is pivoted at the left hand end of the arm 198, as shown, the clevis 201 being provided with a downwardly extending rod 202 which is shown as extending through the arm 198 and having a washer and cotter pin, as indicated at 203, for holding the member 201 in place. The clevis 201 provides legs 205 which extend upwardly to either side of the gear 164 of the member 163. As mentioned before, it is necessary that the gear 142 disengage the gear 168 before it is engaged by the back gear element 165. The back gear shifting arrangements which I have provided accomplish this.

By swinging the back gear shifting lever 180 into the position indicated by the dotted lines 208 of Fig. 6, the upper segment 184 is shifted into the position indicated by the broken lines 209 of Fig. 8. The segment 184, due to the engagement of the teeth 185 thereof with the teeth 197, moves the lower segment into the position indicated by the dotted lines 210. When the upper segment 184 moves into the position 209, the drive gear shifting member 190 moves the driving gear 142 out of engagement with the gear 168 and into the position indicated by the dot and dash lines 211 of Fig. 9. When the lower segment 195 is moved into the position indicated by the broken lines 210 of Fig. 8, the pivoted arm 198 is moved thereby from the position shown in full lines in Fig. 9 into the position indicated by the dot and dash lines 212 of Fig. 9. When the arm 198 is in the position 212, the back gear member 163 is moved into the position indicated by the dotted lines 167 of Fig. 4 and into the position indicated by the dot and dash lines 213 of Fig. 9. It will be seen that when the member 163 is moved to the right and that when the gear 142 is moved to the left, the gear 142 is disengaged with the gear 168 and is engaged with the gear 164 of the back gear member 163. The gear 165 at this time is brought into engagement with the gear 168 which is secured on the spindle 136. It will be seen that at this time the motion of the sleeve 135 is imparted to the member 163 due to the engagement of the gears 142 and 164, and that motion is transmitted from the member 163 to the spindle 136 due to the engagement of the gear 165 with the gear 168.

Again referring to Fig. 8, it will be seen that owing to the provision of the lug member 196 and the pitch face 186 the upper segment 184 will move into the position indicated by the dotted lines 216 of Fig. 8 before any motion is imparted to the lower segment 195. In other words, the lower segment 195 does not rotate until the first tooth 217 of the member 184 engages the lug 196. When this occurs the member 184 has moved into the position indicated by the dotted lines 216 of this figure. This construction moves the gear 142 out of engagement before any moving of the back gear member 163 occurs. This is provided as a matter of precaution so that there will be absolutely no chance of both the gear 165 and the gear 142 engaging the gear 168 at the same time. From Figs. 3 and 4 it will be seen that the gear 164 is always enmeshed with gear teeth formed upon the periphery of the left hand wall 218 of the slot 193. Thus it will be seen that when the gears are shifted the teeth of the gear 164 and the gear 142 are always in alignment. This eliminates the danger of the impossibility of shifting the back gear member 163 due to the disalignment of the teeth of the gears 142 and 164.

By the various combinations of shifts possible by the three shifting levers, it is possible to obtain twelve variations of speed in the spindle 136. It will be seen that by various additions of gears which might be possible, a greater number of speeds might be obtained.

The sequence of operation which may be followed in the running of the lathe is as follows:

Considering that the workman has previously set up the work in the lathe and has adjusted the gear box to provide the suitable speed in the rods 15 and 16, the workman may consult a chart, as indicated at 220, to find the position of the control levers for the speed at which he wishes the spindle of the head to rotate. The workman may then shift the levers 128, 148 and 180 into the indicated position. He then throws in the clutch by operating either of the control levers 78 or 79, moving them in the proper direction to either forwardly or reversibly drive the spindle as desired. The actuation of the clutch and the shifting mechanism have all been previously described and a repetition thereof is not necessary. When working on intricate work and it is necessary to stop very quickly and at a certain point, he may do this by quickly swinging either of the operating levers in a manner to cause the inactive clutch band to engage the inactive gear. It will readily be seen that this action serves as a brake and the spindle may be stopped almost instantly. Due to the fact that the lever 79 is slidably mounted on the shaft 75 and that it is arranged to move with the carriage 13, it will always be at the convenience of the operator no matter what position or place on the lathe he is working.

From the foregoing description it will be seen that a lathe incorporating features of my invention is arranged to provide a great variety of spindle speeds. In one of the lathes which I have built I find it very desirable to arrange the speeds from eight revolutions to 308 revolutions per minute. This great range in speeds particularly adapts the lathe to a great variety of work. It will further be seen that it is very convenient and easy to obtain the various speeds due to the simplicity of the shifting of the levers and of the suitable position thereof. Because of the particular arrangement of the shifting mechanism, it is impossible to shift more than one gear on one shaft into engagement with the gears on the other shaft. In this manner a danger of damaging the lathe head due to the locking of the gears is entirely eliminated. All of these features incorporated into one lathe provides a machine which is of great value in the mechanical industry.

I have described one embodiment of my invention. It should be understood, however, that various changes may be made by those skilled in the art and various modifications may be made due to the commercialization of the lathe, without in any way departing from the spirit and scope of the invention.

I claim as my invention:

1. In a headstock, the combination of: a primary shaft; means for driving said primary shaft; a primary rotatable gear rotatable on said primary shaft; a primary splined gear splined on said primary shaft; a secondary shaft; secondary driven gears non-rotatable on said secondary shaft, one of said gears being permanently in mesh with said primary rotatable gear; means for driving said secondary shaft by said primary shaft through various combinations of said primary and secondary driven gears; a tertiary shaft; a tertiary rotatable gear rotatable on said tertiary shaft; a tertiary splined driven gear splined on said tertiary shaft; means for driving said tertiary shaft by said secondary shaft through various combinations of said secondary driven gears and said tertiary rotatable and splined driven gears; a spindle; a spindle gear on said spindle; a tertiary splined drive gear having a clutch means arranged to engage and drive said spindle; back gears; and means for driving said spindle by said tertiary shaft through said back gears.

2. In a headstock, the combination of: a primary shaft; means for driving said primary shaft; a primary rotatable gear rotatable on said primary shaft; a primary splined gear splined on said primary shaft; a secondary shaft; secondary driven gears non-rotatable on said secondary shaft, one of said gears being permanently in mesh with said primary rotatable gear; mechanism for shifting said primary splined gear so as to drive said secondary shaft through said primary rotatable gear or through said primary splined gear and other of said secondary driven gears; a tertiary shaft; a tertiary rotatable gear rotatable on said tertiary shaft; a tertiary splined driven gear splined on said tertiary shaft; means for driving said tertiary shaft by said secondary shaft through various combinations of said secondary driven gears and said tertiary rotatable and splined driven gears; a spindle; a spindle gear on said spindle; a tertiary splined drive gear having a clutch means arranged to engage end drive said spindle; back gears; and means for driving said spindle by said tertiary shaft through said back gears.

3. In a headstock, the combination of: a primary shaft; means for driving said primary shaft; a primary rotatable gear rotatable on said primary shaft; a primary splined gear splined on said primary shaft; a secondary shaft; secondary driven gears non-rotatable on said secondary shaft, one of said gears being permanently in mesh with said primary rotatable gear; means for driving said secondary shaft by said primary shaft through various combinations of said primary and secondary driven gears; a tertiary shaft; a tertiary rotatable gear rotatable on said tertiary shaft; a tertiary splined driven gear splined on said tertiary shaft; mechanism for shifting said tertiary driven splined gear so as to drive said tertiary shaft either through said tertiary rotatable gear or said tertiary splined driven gear; a spindle; a spindle gear on said spindle; a tertiary splined drive gear having a clutch means arranged to engage and drive said spindle; back gears; and means for driving said spindle by said tertiary shaft through said back gears.

4. In a headstock, the combination of: a primary shaft; means for driving said primary shaft; a primary rotatable gear rotatable on said primary shaft; a primary splined gear splined on said primary shaft; a secondary shaft; secondary driven gears non-rotatable on said secondary shaft, one of said gears being permanently in mesh with said primary rotatable gear; mechanism for shifting said primary driven splined gear so as to drive said secondary shaft either through said primary rotatable gear or said primary splined driven gear; a tertiary shaft; a tertiary rotatable gear rotatable on said tertiary shaft; a tertiary splined driven gear splined on said tertiary shaft; means for driving said tertiary shaft by said secondary shaft through various combinations of said secondary driven gears and said tertiary rotatable and splined driven gears; a spindle; a spindle gear on said spindle; a tertiary splined driven gear having a clutch means arranged to engage and drive said spindle; back gears; and means for driving said spindle by said tertiary shaft through said back gears.

5. In a headstock, the combination of: a primary shaft; means for driving said primary shaft; a primary rotatable gear on said primary shaft having a positive clutch element; a primary splined gear slidable on said shaft having a positive clutch element; a secondary shaft; secondary driven gears on said secondary shaft, one of said secondary driven gears being permanently in mesh with said primary rotatable gear; a primary gear shifting mechanism arranged to shift said primary splined gear either into engagement with certain of said secondary driven gears or so as to cause engagement between said positive clutch elements to drive said secondary shaft at various speeds; a tertiary shaft; means for driving said tertiary shaft by engagement with the secondary gears of said secondary shaft; a tertiary splined drive gear on said tertiary shaft having a positive clutch element; a spindle; a spindle gear secured to said spindle having a positive clutch element, said element being arranged to be engaged by said clutch element of said tertiary splined drive gear in a manner to drive said spindle; a back gear; and means for moving said tertiary splined drive gear out of engagement with said spindle gear, and moving said back gear into engagement with said spindle gear in a manner to drive said spindle by said tertiary member through said back gear.

6. In combination: a rotatable spindle; a spindle gear secured to said spindle; a sleeve rotatable on said spindle; means for rotating said sleeve; a drive gear disposed on said sleeve, said drive gear having a direct driving engagement with said spindle; a back gear; and means for shifting said drive gear out of direct driving engagement with said spindle and said back gear into engagement with said spindle gear so as to drive said spindle through said back gear, said shifting means comprising an actuating lever, an upper segment swingable by the actuation of said lever, a drive gear engager in engagement with said drive gear, said drive gear engager moving said drive gear out of direct driving engagement with said spindle when said upper segment is swung, a pivoted lower segment swingable by said upper segment, a back gear engager in engagement with said back gear, and means whereby said back gear engager is moved in a manner to shift said back gear into engagement with said spindle and said drive gears when said lower segment is swung.

7. A combination as defined in claim 6 in which said upper segment is moved previous to the moving of said lower segment.

8. In combination: a rotatable spindle; a spindle gear secured to said spindle; a sleeve rotatable on said spindle; means for rotating said sleeve; a drive gear disposed on said sleeve, said drive gear having a direct driving engagement with said spindle; a back gear; and means for shifting said drive gear out of direct driving engagement with said spindle and said back gear into engagement with said spindle gear so as to drive said spindle through said back gear, said shifting means comprising an actuating lever, an upper segment swingable by the actuation of said lever, a drive gear engager in engagement with said drive gear, said drive gear engager moving said drive gear out of direct driving engagement with said spindle when said upper segment is swung, a pivoted lower segment swingable by said upper segment, a back gear engager in engagement with said back gear, and a pivoted arm connecting said back gear engager and said lower segment, said pivoted arm being arranged to move said back gear in a manner to shift said back gear into engagement with said spindle and said drive gears when said lower segment is swung.

9. In combination: a rotatable spindle; a spindle gear secured to said spindle; a sleeve rotatable on said spindle; means for rotating said sleeve; a drive gear disposed on said sleeve, said drive gear being capable of engaging said spindle gear to drive said spindle; a back gear; and means for shifting said drive gear out of engagement and said back gear into engagement with said spindle gear so as to drive said spindle through said back gear, said shifting means comprising a back gear engager engaging said back gear, a lever on which said back gear engager is supported, a drive gear engager, and means whereby said drive gear engager and said back gear engager are moved in opposite directions, and whereby said drive gear engager moves a distance prior to the moving of said back gear engager sufficiently to disengage said drive gear and said spindle gear.

In testimony whereof, I have hereunto set my hand at Los Angeles, California, this 18th day of June, 1924.

WILHELM JARDH.